(12) United States Patent
Sun

(10) Patent No.: US 10,057,645 B2
(45) Date of Patent: Aug. 21, 2018

(54) SET TOP BOX UPGRADE METHOD AND APPARATUS

(71) Applicant: ZTE Corporation, Shenzhen (CN)

(72) Inventor: Xianjiang Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/503,433

(22) PCT Filed: Apr. 2, 2015

(86) PCT No.: PCT/CN2015/075809
§ 371 (c)(1),
(2) Date: Feb. 13, 2017

(87) PCT Pub. No.: WO2016/023373
PCT Pub. Date: Feb. 18, 2016

(65) Prior Publication Data
US 2017/0230713 A1    Aug. 10, 2017

(30) Foreign Application Priority Data
Aug. 15, 2014    (CN) .......................... 2014 1 0404751

(51) Int. Cl.
*H04N 21/236* (2011.01)
*H04N 21/254* (2011.01)
(Continued)

(52) U.S. Cl.
CPC ....... *H04N 21/4516* (2013.01); *H04N 21/458* (2013.01)

(58) Field of Classification Search
CPC ....... H04N 21/23614; H04N 21/23617; H04N 21/254; H04N 21/25808; H04N 21/262; H04N 21/26291
(Continued)

(56) References Cited

U.S. PATENT DOCUMENTS

2007/0294362 A1    12/2007    Patel
2010/0313236 A1*  12/2010    Straub ................ H04N 21/4349
                                              725/146
(Continued)

FOREIGN PATENT DOCUMENTS

| CN | 101883254 A | 11/2010 |
| CN | 103067779 A | 4/2013 |

OTHER PUBLICATIONS

International Search Report for corresponding application No. PCT/CN2015/075809 filed on Apr. 2, 2015; dated Jul. 3, 2015.
(Continued)

*Primary Examiner* — Dominic D Saltarelli
(74) *Attorney, Agent, or Firm* — Cantor Colburn LLP

(57) ABSTRACT

Provided are a set top box upgrade method and apparatus. In the method, a version number of a current batch of set top boxes is acquired. It is judged, according to the version number, whether to upgrade the batch of set top boxes in batch. When it is judged to upgrade the batch of set top boxes in batch, the batch of set top boxes is upgraded in batch according to an upgrade mode for each set top box in the batch of set top boxes. By means of the technical solution, the problem of lack of support for a batch upgrade according to an existing upgrade mode causing significant waste of resources in the related art is solved. Set top boxes can be upgraded in batch and user experience can be improved.

12 Claims, 3 Drawing Sheets

(51) Int. Cl.
    *H04N 21/258*      (2011.01)
    *H04N 21/262*      (2011.01)
    *H04N 21/45*      (2011.01)
    *H04N 21/458*      (2011.01)

(58) Field of Classification Search
    USPC ................................. 725/32–36, 116, 146
    See application file for complete search history.

(56) References Cited

U.S. PATENT DOCUMENTS

| | | |
|---|---|---|
| 2012/0124145 A1 | 5/2012 | Krietzman |
| 2014/0019952 A1 | 1/2014 | Shamsaasef |
| 2014/0157249 A1 | 6/2014 | Pere |

OTHER PUBLICATIONS

European Search Report for corresponding application EP 15 83 2253; Report dated Aug. 1, 2017.

\* cited by examiner

SET TOP BOX UPGRADE METHOD AND APPARATUS

TECHNICAL FIELD

The present disclosure relates to the field of communications, and in particular to a set top box upgrade method and apparatus.

BACKGROUND

With great increase of set top box users, the frequency of failure of set top boxes is greatly increased. In related art, as long as an upgrade package exists, a set top box would download the upgrade package and complete the upgrade according to the upgrade package without judgement on the upgrade package. No matter whether the set top box needs to be upgraded, the set top box would be upgraded. A traditional upgrade mode cannot meet requirements on field maintenance any longer. For example, a batch upgrade cannot be implemented by means of a set top box management system, and a great number of resources is wasted.

An effective solution has not been proposed yet at present for the problem of lack of support for a batch upgrade according to an existing upgrade mode causing significant waste of resources in the related art.

SUMMARY

Embodiments of the present disclosure provide a set top box upgrade method and apparatus, which are intended to at least solve the problem of lack of support for a batch upgrade according to an existing upgrade mode causing significant waste of resources in the related art.

According to an aspect of the embodiments of the present disclosure, a set top box upgrade method is provided, which may include that: a version number of a current batch of set top boxes is acquired; it is judged, according to the version number, whether to upgrade the batch of set top boxes in batch; and when it is judged to upgrade the batch of set top boxes in batch, the batch of set top boxes is upgraded in batch according to an upgrade mode for each set top box in the batch of set top boxes.

In the present embodiment, the step that the batch of set top boxes is upgraded in batch according to the upgrade mode for each set top box in the batch of set top boxes may include that: it is determined to upgrade the batch of set top boxes in batch when a quantity of the set top boxes to be upgraded in batch is greater than a preset value.

In the present embodiment, the step that the batch of set top boxes is upgraded in batch according to the upgrade mode for each set top box in the batch of set top boxes may include that: the version number is compared with a version number existing in a server; when the version number is identical to the version number existing in the server, upgrade of the batch of set top boxes is abandoned; and/or, when the version number is different from the version number existing in the server, it is determined to upgrade the batch of set top boxes in batch.

In the present embodiment, before the batch of set top boxes is upgraded in batch according to the upgrade mode for each set top box in the batch of set top boxes, the method may include that: the upgrade mode for each set top box in the batch of set top boxes is determined.

In the present embodiment, the step that the batch of set top boxes is upgraded in batch according to the determined upgrade mode for the batch of set top boxes may include at least one of the following steps. When the upgrade mode is a silent upgrade mode, an upgrade package is provided for the batch of set top boxes to enable the batch of set top boxes to download the upgrade package in background. When the upgrade mode is a non-silent upgrade mode, an instruction indicative of enforcement or non-enforcement is issued, and when the instruction is indicative of enforcement, an upgrade package is provided for the batch of set top boxes to enable the batch of set top boxes to download the upgrade package. When the instruction is indicative of non-enforcement, user-selected upgrade indications acquired by the batch of set top boxes are received, and an upgrade package is provided for the batch of set top boxes to enable the batch of set top boxes to download the upgrade package.

In the present embodiment, before the batch of set top boxes is upgraded in batch according to the upgrade mode for each set top box in the batch of set top boxes, the method may further include that: upgrade of a set top box is triggered according to a predetermined trigger mode for triggering upgrade of the set top box, wherein a trigger type includes: time trigger or event trigger.

According to another aspect of the embodiments of the present disclosure, a set top box upgrade apparatus is provided, which may include: an acquisition module, arranged to acquire a version number of a current batch of set top boxes; a judgement module, arranged to judge, according to the version number, whether to upgrade the batch of set top boxes in batch; and an upgrade module, arranged to upgrade, when it is judged to upgrade the batch of set top boxes in batch, the batch of set top boxes in batch according to an upgrade mode for each set top box in the batch of set top boxes.

In the present embodiment, the upgrade module may include: a first upgrade unit, arranged to determine to upgrade the batch of set top boxes in batch when a quantity of the set top boxes to be upgraded in batch is greater than a preset value.

In the present embodiment, the upgrade module may include: a comparison unit, arranged to compare the version number with a version number existing in a server; an abandoning unit, arranged to abandon, when the version number is identical to the version number existing in the server, upgrade of the batch of set top boxes; and/or, a second upgrade unit, arranged to determine, when the version number is different from the version number existing in the server, to upgrade the batch of set top boxes in batch.

In the present embodiment, the apparatus may further include: a determination module, arranged to determine the upgrade mode for each set top box in the batch of set top boxes.

In the present embodiment, the upgrade module may include at least one of: a provision unit, arranged to provide, when the upgrade mode is a silent upgrade mode, an upgrade package for the batch of set top boxes to enable the batch of set top boxes to download the upgrade package in background; and an issuing unit, arranged to issue, when the upgrade mode is a non-silent upgrade mode, an instruction indicative of enforcement or non-enforcement; provide, when the instruction is indicative of enforcement, an upgrade package for the batch of set top boxes to enable the batch of set top boxes to download the upgrade package; when the instruction is indicative of non-enforcement, receive user-selected upgrade indications acquired by the batch of set top boxes, and provide an upgrade package for the batch of set top boxes to enable the batch of set top boxes to download the upgrade package.

In the present embodiment, the apparatus may further include: a trigger module, arranged to trigger upgrade of a set top box according to a predetermined trigger mode for triggering upgrade of the set top box, wherein a trigger type includes: time trigger or event trigger.

By means of the technical solutions provided by the embodiments of the present disclosure, a version number of a current batch of set top boxes is acquired; it is judged, according to the version number, whether to upgrade the batch of set top boxes in batch; and when it is judged to upgrade the batch of set top boxes in batch, the batch of set top boxes is upgraded in batch according to an upgrade mode for each set top box in the batch of set top boxes. The problem of lack of support for a batch upgrade according to an existing upgrade mode causing significant waste of resources in the related art is solved. Set top boxes can be upgraded in batch and user experience can be improved.

BRIEF DESCRIPTION OF THE DRAWINGS

The accompanying drawings described herein are intended to provide further understanding of the present disclosure, and form a part of the present application. The schematic embodiments and descriptions of the present disclosure are intended to explain the present disclosure, and do not form improper limits to the present disclosure. In the accompanying drawings.

DETAILED DESCRIPTION OF THE EMBODIMENTS

The present disclosure will be described below with reference to the accompanying drawings and in conjunction with the embodiments in detail. It is important to note that the embodiments in the present application and the features in the embodiments may be combined under the condition of no conflicts.

Figure 1:
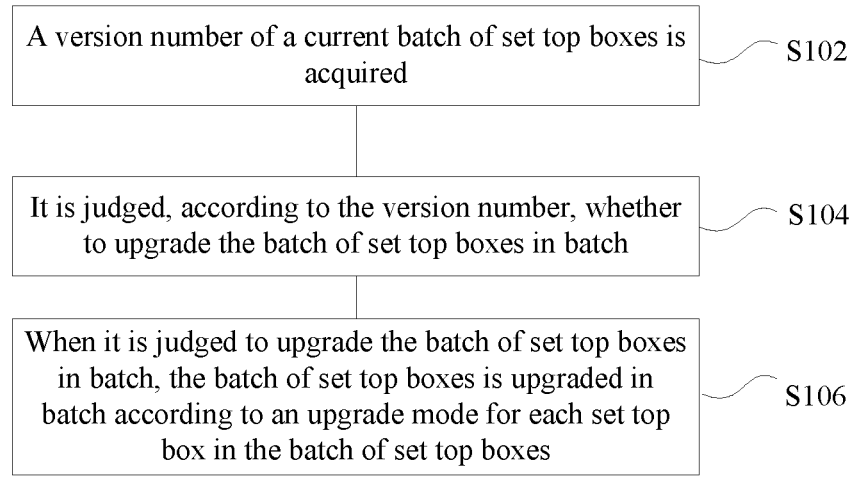
FIG. 1 is a flowchart of a set top box upgrade method according to an embodiment of the present disclosure.

A cell selection method is provided in an embodiment of the present disclosure. FIG. 1 is a flowchart of a set top box upgrade method according to the embodiment of the present disclosure. As shown in FIG. 1, the method includes the following steps.

Step S102: A version number of a current batch of set top boxes is acquired.

Step S104: It is judged, according to the version number, whether to upgrade the batch of set top boxes in batch.

Step S106: When it is judged to upgrade the batch of set top boxes in batch, the batch of set top boxes is upgraded in batch according to an upgrade mode for each set top box in the batch of set top boxes.

By means of the above-mentioned steps, a version number of a current batch of set top boxes is acquired; it is judged, according to the version number, whether to upgrade the batch of set top boxes in batch; and when it is judged to upgrade the batch of set top boxes in batch, the batch of set top boxes is upgraded in batch according to an upgrade mode for each set top box in the batch of set top boxes. The problem of lack of support for a batch upgrade according to an existing upgrade mode causing significant waste of resources in the related art is solved. Set top boxes can be upgraded in batch and user experience can be improved.

As an exemplary implementation mode, it is determined to upgrade the batch of set top boxes in batch when a quantity of the set top boxes to be upgraded in batch is greater than a preset value. Conditions for batch upgrade may be preset. The preset value may be set according to a practical requirement, so that the batch of set top boxes can be better managed in a unified way.

In the present embodiment, the version number is compared with a version number existing in a server; when the version number is identical to the version number existing in the server, upgrade of the batch of set top boxes is abandoned, thereby reducing unnecessary upgrades so as not to influence the experience of a user; and/or, when the version number is different from the version number existing in the server, it is determined to upgrade the batch of set top boxes in batch, thereby effectively completing the batch upgrade of the batch of set top boxes.

As an exemplary implementation mode, before the batch of set top boxes is upgraded in batch according to the upgrade mode for each set top box in the batch of set top boxes, the upgrade mode for each set top box in the batch of set top boxes is determined. The step that the batch of set top boxes is upgraded in batch according to the determined upgrade mode for the batch of set top boxes may include at least one of the following steps. When the upgrade mode is a silent upgrade mode, an upgrade package is provided for the batch of set top boxes to enable the batch of set top boxes to download the upgrade package in background. When the upgrade mode is a non-silent upgrade mode, an instruction indicative of enforcement or non-enforcement is issued. When the instruction is indicative of enforcement, an upgrade package is provided for the batch of set top boxes to enable the batch of set top boxes to download the upgrade package. When the instruction is indicative of non-enforcement, user-selected upgrade indications acquired by the batch of set top boxes are received, and an upgrade package is provided for the batch of set top boxes to enable the batch of set top boxes to download the upgrade package.

In the present embodiment, upgrade of a set top box is triggered according to a predetermined trigger mode for triggering upgrade of the set top box. A trigger type may include: time trigger or event trigger. When a trigger condition is satisfied, upgrade of the set top box is triggered. The time trigger may be classified into single time trigger and periodic timing trigger. The event trigger is trigger of upgrade of a set top box according to an event number reported by the set top box. The events may include the following four types of events, namely first power-on, non-first power-on, periodic report, and parameter update. As for the parameter update, for example, when coding and decoding parameters are updated in a message receiving and sending process of the set top box, upgrade of the set top box is triggered.

Figure 2:
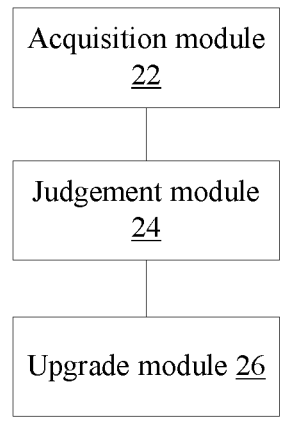
FIG. 2 is a block diagram of a set top box upgrade apparatus according to an embodiment of the present disclosure.

Another embodiment of the present disclosure provides a set top box upgrade apparatus. FIG. 2 is a block diagram of a set top box upgrade apparatus according to the embodiment of the present disclosure. As shown in FIG. 2, the apparatus includes: an acquisition module 22, a judgement module 24, and an upgrade module 26. Each module will be described below in detail.

The acquisition module 22 is arranged to acquire a version number of a current batch of set top boxes.

The judgement module 24 is arranged to judge, according to the version number, whether to upgrade the batch of set top boxes in batch.

The upgrade module 26 is arranged to upgrade, when it is judged to upgrade the batch of set top boxes in batch, the batch of set top boxes in batch according to an upgrade mode for each set top box in the batch of set top boxes.

In the present embodiment, the upgrade module 26 may include: a first upgrade unit, arranged to determine to upgrade the batch of set top boxes in batch when a quantity of the set top boxes to be upgraded in batch is greater than a preset value.

In the present embodiment, the upgrade module 26 may include: a comparison unit, arranged to compare the version number with a version number existing in a server; an abandoning unit, arranged to abandon, when the version number is identical to the version number existing in the server, upgrade of the batch of set top boxes; and/or, a second upgrade unit, arranged to determine, when the version number is different from the version number existing in the server, to upgrade the batch of set top boxes in batch.

Figure 3:
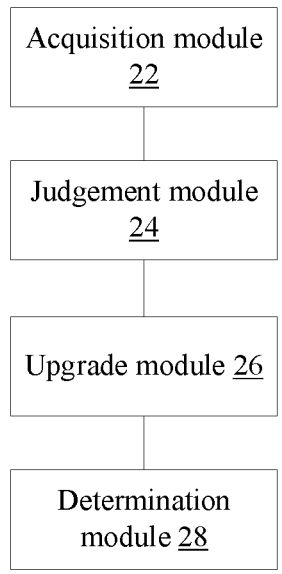
FIG. 3 is a block diagram 1 of a set top box upgrade apparatus according to an exemplary embodiment of the present disclosure.

FIG. 3 is a block diagram 1 of a set top box upgrade apparatus according to an exemplary embodiment of the present disclosure. As shown in FIG. 3, as an exemplary implementation mode, the apparatus may further include: a determination module 28, arranged to determine the upgrade mode for each set top box in the batch of set top boxes.

In the present embodiment, the upgrade module 26 may include at least one of: a provision unit, arranged to provide, when the upgrade mode is a silent upgrade mode, an upgrade package for the batch of set top boxes to enable the batch of set top boxes to download the upgrade package in background; and an issuing unit, arranged to issue, when the upgrade mode is a non-silent upgrade mode, an instruction indicative of enforcement or non-enforcement; provide, when the instruction is indicative of enforcement, an upgrade package for the batch of set top boxes to enable the batch of set top boxes to download the upgrade package; when the instruction is indicative of non-enforcement, receive user-selected upgrade indications acquired by the batch of set top boxes, and provide an upgrade package for the batch of set top boxes to enable the batch of set top boxes to download the upgrade package.

Figure 4:
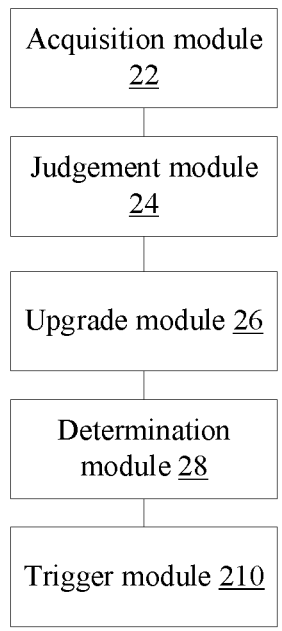
FIG. 4 is a block diagram 2 of a set top box upgrade apparatus according to an exemplary embodiment of the present disclosure.

FIG. 4 is a block diagram 2 of a set top box upgrade apparatus according to an exemplary embodiment of the present disclosure. As shown in FIG. 4, as a more exemplary implementation mode, the apparatus may further include: a trigger module 210, arranged to trigger upgrade of a set top box according to a predetermined trigger mode for triggering upgrade of the set top box, wherein a trigger type includes: time trigger or event trigger.

Descriptions are made based on exemplary embodiments as follows. The following exemplary embodiments may be a combination of the above-mentioned embodiments and exemplary implementation modes thereof.

A set top box management system in the present embodiment completes upgrade of a batch of set top boxes. An implementable method for upgrading version and configuration files of set top boxes in batch is provided.

The set top box management system performs upgrade version judgement on set top boxes to be upgraded in the current batch, and set top boxes needing to be upgraded according to the judgement enter an upgrade procedure. A batch upgrade policy is classified into event trigger and time trigger. An upgrade mode includes silent upgrade and non-silent upgrade. The non-silent upgrade is further classified into enforced upgrade and prompted upgrade.

Figure 5:
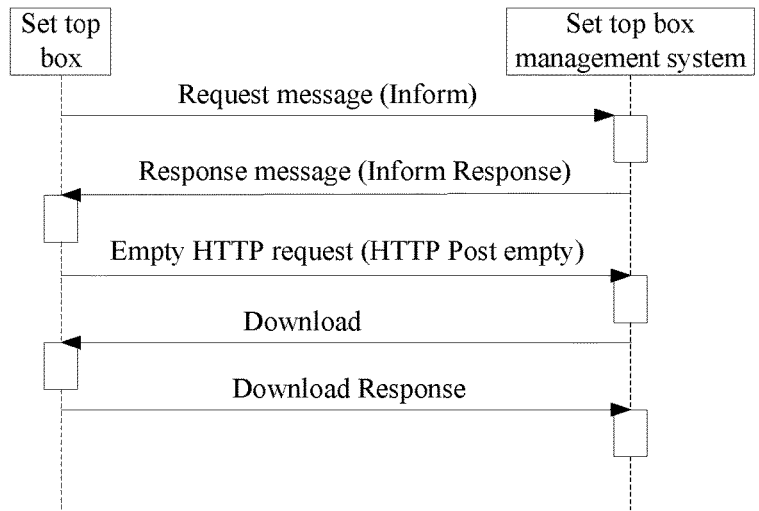
FIG. 5 is a schematic diagram of a set top box upgrade method according to an exemplary embodiment of the present disclosure.

FIG. 5 is a schematic diagram of a set top box upgrade method according to an exemplary embodiment of the present disclosure. As shown in FIG. 5, a set top box sends a request message (e.g., Inform) to a set top box management system, receives a response message (e.g., Inform Response) sent by the set top box management system upon receiving the request message (e.g., Inform), sends an empty HTTP request (e.g., HTTP Post empty) to the set top box management system, receives a download instruction issued by the set top box management system and performs downloading, and sends a download response (e.g., Download Response) to the set top box management system after the downloading is completed. A server completes configuration of batch upgrade task of a client. The server triggers batch upgrade via a tr069 inform message type reported by the set top box, where the message is sent to a set top box management system by means of the set top box tr069. The set top box management system triggers upgrade by means of a preset time task. The message is sent to the set top box by means of an HTTP active link establishment message of the set top box management system, and then the set top box sends an inform to perform message interaction.

A batch upgrade system of the set top box management system mainly includes: a set top box management system server, a WEB page display client, set top boxes, etc.

The set top boxes comply with a standard tr069 specification, and are registered to the set top box management system by means of a network management module. The set top box management system performs http digest authentication processing, and the set top boxes complying with the standard tr069 specification are registered to the set top box management system. The set top box management system stores node information of processed set top boxes into a database.

According to a node parameter (e.g., software version number: Device.DeviceInfo.SoftwareVersion) of the set top box, a version number of a current set top box is compared with a version number set by the set top box management system. If the version number of the current set top box is identical to the version number set by the set top box management system, upgrade is not performed. If the version number of the current set top box is different from the version number set by the set top box management system, an upgrade procedure is entered. The set top box management system triggers upgrade of the set top box according to an upgrade trigger type. There are two upgrade trigger types, i.e., time trigger and event trigger. An upgrade mode is classified into a silent mode and a non-silent mode. As an exemplary implementation mode, a node parameter Device.X_CMCC_OTV.ServiceInfo.SilentUpgrade=0 of the set top box is indicative of the non-silent mode, Device.X_CMCC_OTV.ServiceInfo.SilentUpgrade=1 is indicative of the silent mode, and a default value is 1.

(1) Silent Upgrade Mode:

A: a firmware upgrade package is downloaded in background, and usage of a user is not influenced; and B: after downloading of the firmware upgrade package is completed, a prompt box pops up, and the user may select whether to continue upgrading.

(2) Non-Silent Upgrade Mode:

A: an instruction parameter issued at DOWNLOAD by a set top box network management system contains an indicator indicative of enforcement or non-enforcement (0 is indicative of non-enforcement, 1 is indicative of enforcement), and after judgement, the set top box executes different procedures; and B: a format of parameters issued by the platform is:

<CommandKey>indicator indicative of enforcement or non-enforcement-sequence number<CommandKey>.

For example:

<CommandKey>0-ABCD<CommandKey> is parsed as non-enforcement;

<CommandKey>1-ABCD<CommandKey> is parsed as enforcement.

An upgrade process monitoring module of the set top box management system judges an upgrade state of the set top box. If the upgrade state of the set top box is SUCCESS, and the set top box has reported the success state to the set top box management system, the upgrade state of the set top box is updated to SUCCESS in the set top box management system. If this upgrade is stopped halfway due to a network reason or an artificial reason, the upgrade state of the set top box is updated to FAILURE in the set top box management system.

The set top box is successfully registered to the management system by means of a tr069 protocol. An upgrade version of the set top boxes to be upgraded is uploaded in the set top box management system, and information such as an upgrade target version number, an upgrade path, a set top box manufacturer and a model are filled. An upgrade task is created, and an upgrade type including an upgrade version and an upgrade configuration file is selected. An upgrade mode, a set top box model, a trigger type, execution time, an execution mode, etc are selected. A batch of set top box devices to be upgraded is selected. A boot event of the set top box triggers the upgrade procedure to start upgrading, or the set top box management system triggers the upgrade procedure at a preset time to start upgrading. The upgrade states of the set top boxes are displayed on a query interface of the management system after the upgrading is completed.

Figure 6:
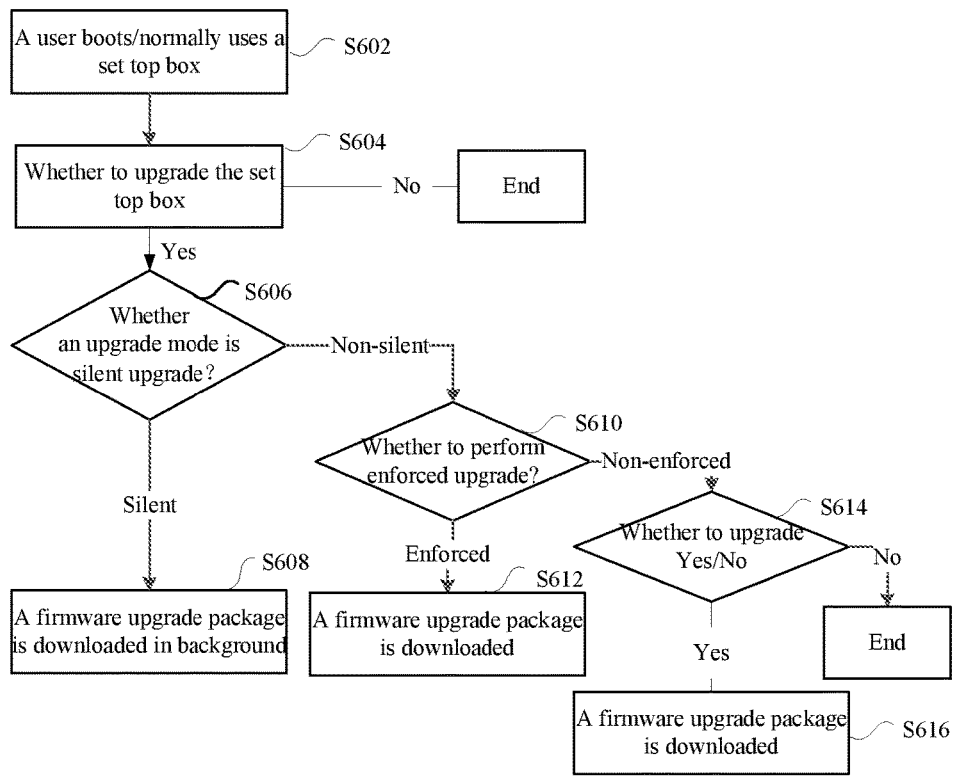
FIG. 6 is a flowchart of a set top box upgrade method according to an exemplary embodiment of the present disclosure.

FIG. 6 is a flowchart of a set top box upgrade method according to an exemplary embodiment of the present disclosure. As shown in FIG. 6, the set top box upgrade method in the present embodiment includes the following steps.

Step S602: A user boots/normally uses a set top box.

Step S604: It is judged whether to upgrade the set top box. When it is judged to upgrade the batch of set top boxes, Step S606 is executed, and otherwise, the flow ends.

Step S606: It is judged whether an upgrade mode for the set top box is silent upgrade, when a judgement result is that the upgrade mode is the silent upgrade, Step S608 is executed, and if the judgement result is that the upgrade mode is non-silent upgrade, Step S610 is executed.

Step S608: The set top box downloads a firmware upgrade package in background.

Step S610: It is judged whether to execute enforced upgrade on the set top box, when it is judged to execute enforced upgrade on the set top box, Step S612 is executed, and when it is judged not to execute enforced upgrade on the set top box, Step S614 is executed.

Step S612: The set top box downloads a firmware upgrade package.

Step S614: The user is prompted to select whether to perform upgrade or not, if the user selects to perform upgrade, Step S616 is executed, and otherwise, the flow ends.

Step S616: The set top box downloads a firmware upgrade package.

In the present embodiment, the set top box management system may determine to upgrade a batch of set top boxes by means of judgement, perform different types of processing according to an upgrade mode for each set top box. When the upgrade mode is silent upgrade, the set top box management system may provide a download upgrade package to the set top box, and the set top box may download the upgrade package in background without influencing working of the set top box. When the upgrade mode is a non-silent upgrade mode, an enforced or non-enforced upgrade command is issued to the set top box. If the enforced upgrade command is issued, an upgrade package is directly provided for the set top box and downloaded. If the non-enforced upgrade command is issued, the set top box receives the command, a prompt box pops up to prompt a user to select whether to upgrade or not, and upgrade processing is performed according to the selection of the user. By means of the above-mentioned content, the set top box can be upgraded, thereby improving the user experience.

Obviously, those skilled in the art should understand that all modules or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from the sequence under certain conditions, or they are manufactured into each integrated circuit module respectively, or a plurality of modules or steps therein is manufactured into a single integrated circuit module. Thus, the present disclosure is not limited to combination of any specific hardware and software.

The above is only the preferred embodiments of the present disclosure, and not intended to limit the present disclosure. There may be various modifications and variations in the present disclosure for those skilled in the art. Any modifications, equivalent replacements, improvements and the like within the principle of the present disclosure shall fall within the scope of protection defined in the appended claims of the present disclosure.

INDUSTRIAL APPLICABILITY

As above, by means of the above-mentioned embodiments and exemplary implementation modes, the problem of lack of support for a batch upgrade according to an existing upgrade mode causing significant waste of resources in the related art is solved. Set top boxes can be upgraded in batch and user experience can be improved.

What is claimed is:

1. A set top box upgrade method, comprising:

acquiring, by a set top box management system server, a version number of a current batch of set top boxes;

judging, by the set top box management system server according to the version number, whether to upgrade the batch of set top boxes in batch; and upgrading, by the set top box management system server, the batch of set top boxes in batch according to an upgrade mode for each set top box in the batch of set top boxes, when it is judged to upgrade the batch of set top boxes in batch;

wherein before the batch of set top boxes is upgraded in batch according to the upgrade mode for each set top box in the batch of set top boxes, the method further comprises: determining, by the set top box management system server, the upgrade mode for each set top box in the batch of set top boxes, wherein the upgrade mode comprises: a silent upgrade mode and a non-silent upgrade mode; when the upgrade mode is the silent upgrade mode, providing, by the set top box management system server, an upgrade package for the batch of set top boxes to enable the batch of set top boxes to download the upgrade package in background and prompt the user to select whether to continue upgrading; and when the upgrade mode is a non-silent upgrade mode, issuing, by the set top box management system server, an instruction indicative of enforcement or non-enforcement, and when the instruction is indicative of enforcement, providing, by the set top box management system server, an upgrade package for the batch of set top boxes to enable the batch of set top boxes to download the upgrade package; when the instruction is indicative of non-enforcement, receiving, by the set top box management system server, user-selected upgrade indications acquired by the batch of set top boxes, and providing, by the set top box management system server, an upgrade package for the batch of set top boxes to enable the batch of set top boxes to download the upgrade package.

2. The method as claimed in claim 1, wherein upgrading, by the set top box management system server, the batch of set top boxes in batch according to the upgrade mode for each set top box in the batch of set top boxes comprises:

determining, by the set top box management system server, to upgrade the batch of set top boxes in batch when a quantity of the set top boxes to be upgraded in batch is greater than a preset value.

3. The method as claimed in claim 2, wherein before the batch of set top boxes is upgraded in batch according to the upgrade mode for each set top box in the batch of set top boxes, the method further comprises:

triggering, by the set top box management system server, upgrade of a set top box according to a predetermined trigger mode for triggering upgrade of the set top box, wherein a trigger type comprises: time trigger or event trigger.

4. The method as claimed in claim 1, wherein upgrading, by the set top box management system server, the batch of set top boxes in batch according to the upgrade mode for each set top box in the batch of set top boxes comprises:

comparing, by the set top box management system server, the version number with a version number existing in a server;

when the version number is identical to the version number existing in the server, abandoning, by the set top box management system server, upgrade of the batch of set top boxes; and/or, when the version number is different from the version number existing in the server, determining, by the set top box management system server, to upgrade the batch of set top boxes in batch.

5. The method as claimed in claim 4, wherein before the batch of set top boxes is upgraded in batch according to the upgrade mode for each set top box in the batch of set top boxes, the method further comprises:

triggering, by the set top box management system server, upgrade of a set top box according to a predetermined trigger mode for triggering upgrade of the set top box, wherein a trigger type comprises: time trigger or event trigger.

6. The method as claimed in claim 1, wherein before the batch of set top boxes is upgraded in batch according to the upgrade mode for each set top box in the batch of set top boxes, the method further comprises:

triggering, by the set top box management system server, upgrade of a set top box according to a predetermined trigger mode for triggering upgrade of the set top box, wherein a trigger type comprises: time trigger or event trigger.

7. A set top box upgrade apparatus, comprising a hardware processor coupled with a memory and arranged to execute program instructions stored on the memory, wherein the program instructions comprise:

acquiring a version number of a current batch of set top boxes;

judging, according to the version number, whether to upgrade the batch of set top boxes in batch; and upgrading the batch of set top boxes in batch according to an upgrade mode for each set top box in the batch of set top boxes, when the judgement module judges to upgrade the batch of set top boxes in batch;

wherein the program instructions further comprise: determining the upgrade mode for each set top box in the batch of set top boxes, wherein the upgrade mode comprises: a silent upgrade mode and a non-silent upgrade mode; when the upgrade mode is the silent upgrade mode, providing an upgrade package for the batch of set top boxes to enable the batch of set top boxes to download the upgrade package in background and prompt the user to select whether to continue upgrading; and when the upgrade mode is a non-silent upgrade mode, issuing an instruction indicative of enforcement or non-enforcement, and when the instruction is indicative of enforcement, providing an upgrade package for the batch of set top boxes to enable the batch of set top boxes to download the upgrade package; when the instruction is indicative of non-enforcement, receiving user-selected upgrade indications acquired by the batch of set top boxes, and providing an upgrade package for the batch of set top boxes to enable the batch of set top boxes to download the upgrade package.

8. The apparatus as claimed in claim 7, wherein the program instructions further comprise:

determining to upgrade the batch of set top boxes in batch when a quantity of the set top boxes to be upgraded in batch is greater than a preset value.

9. The apparatus as claimed in claim 8, wherein the program instructions further comprise:

triggering upgrade of a set top box according to a predetermined trigger mode for triggering upgrade of the set top box, wherein a trigger type comprises: time trigger or event trigger.

10. The apparatus as claimed in claim 7, wherein the program instructions further comprise:

comparing the version number with a version number existing in a server;

abandoning, when the version number is identical to the version number existing in the server, upgrade of the batch of set top boxes; and/or, determining, when the version number is different from the version number existing in the server, to upgrade the batch of set top boxes in batch.

11. The apparatus as claimed in claim 10, wherein the program instructions further comprise:
triggering upgrade of a set top box according to a predetermined trigger mode for triggering upgrade of the set top box, wherein a trigger type comprises: time trigger or event trigger.

12. The apparatus as claimed in claim 7, wherein the program instructions further comprise:
triggering upgrade of a set top box according to a predetermined trigger mode for triggering upgrade of the set top box, wherein a trigger type comprises: time trigger or event trigger.

* * * * *